(12) United States Patent
Fonseca et al.

(10) Patent No.: US 6,325,834 B1
(45) Date of Patent: Dec. 4, 2001

(54) EXHAUST FILTER AND CATALYST STRUCTURE

(76) Inventors: Roberto Fonseca, 10838 Magnolia Blvd., No. 113, North Hollywood, CA (US) 91601; Rufino A. Paje, 2801 Sepulveda Blvd., No. 108, Torrance, CA (US) 90505

( * ) Notice: Subject to any disclaimer, the term of this patent is extended or adjusted under 35 U.S.C. 154(b) by 0 days.

(21) Appl. No.: 09/334,903

(22) Filed: Jun. 17, 1999

Related U.S. Application Data

(63) Continuation-in-part of application No. 09/080,749, filed on May 18, 1998, now abandoned.

(51) Int. Cl.$^7$ .................................. B01D 53/34; F01N 3/10
(52) U.S. Cl. ............................ 55/385.3; 55/322; 55/446; 55/466; 55/DIG. 30; 422/171; 422/177; 422/180
(58) Field of Search ................... 55/385.3, 302, 55/466, 523, 322, 446, DIG. 30; 422/171, 177, 180

(56) References Cited

U.S. PATENT DOCUMENTS

| | | | | |
|---|---|---|---|---|
| 3,946,748 | * | 3/1976 | Frankfurt | 131/261 R |
| 4,183,896 | * | 1/1980 | Gordon | 55/DIG. 30 |
| 4,818,497 | * | 4/1989 | Andersson et al. | 55/DIG. 30 |
| 4,852,349 | * | 8/1989 | Abthoff et al. | 55/DIG. 30 |
| 5,008,086 | * | 4/1991 | Merry | 55/DIG. 30 |
| 5,055,274 | * | 10/1991 | Abbott | 55/DIG. 30 |
| 5,119,551 | * | 6/1992 | Abbott | 55/DIG. 30 |
| 5,207,989 | * | 5/1993 | MacNeil | 55/DIG. 30 |
| 5,228,891 | * | 7/1993 | Apiletta | 55/DIG. 30 |
| 5,447,697 | * | 9/1995 | Ito et al. | 422/180 |
| 5,482,681 | * | 1/1996 | Sager, Jr. | 422/180 |
| 5,618,501 | * | 4/1997 | Wieres et al. | 422/180 |
| 5,672,324 | * | 9/1997 | Okamoto et al. | 422/180 |
| 5,882,608 | * | 3/1999 | Sanocki et al. | 422/180 |
| 6,057,263 | * | 5/2000 | Takahashi et al. | 422/180 |

* cited by examiner

Primary Examiner—David A. Simmons
Assistant Examiner—Minh-Chau T. Pham
(74) Attorney, Agent, or Firm—Tope McKay & Associates

(57) ABSTRACT

A filter assembly useful in collecting the particulate matter from a diesel engine onto surfaces on which the combustion vapors are condensed, and thereafter exposing the exhaust stream to catalytic reaction, is defined by a split cavity in which a row of kinematic filter discs is received. The filter discs are stacked in the assembly in a progressively finer opening size, each filter disc making an intimate contact with the assembly housing for cooling. In this manner condensation onto the discs is promoted to provide a liquid bed on which the particulate matter is trapped. The exhaust flow then passes through a coiled, corrugated catalyst surface for further reaction. A set of spring loaded bypass conduits is provided to allow diesel operation at such times when the filter plates and the catalytic coiled surface are clogged. The filter plates and the coiled catalyst strip can then be periodically removed and cleaned, for continued operation.

9 Claims, 4 Drawing Sheets

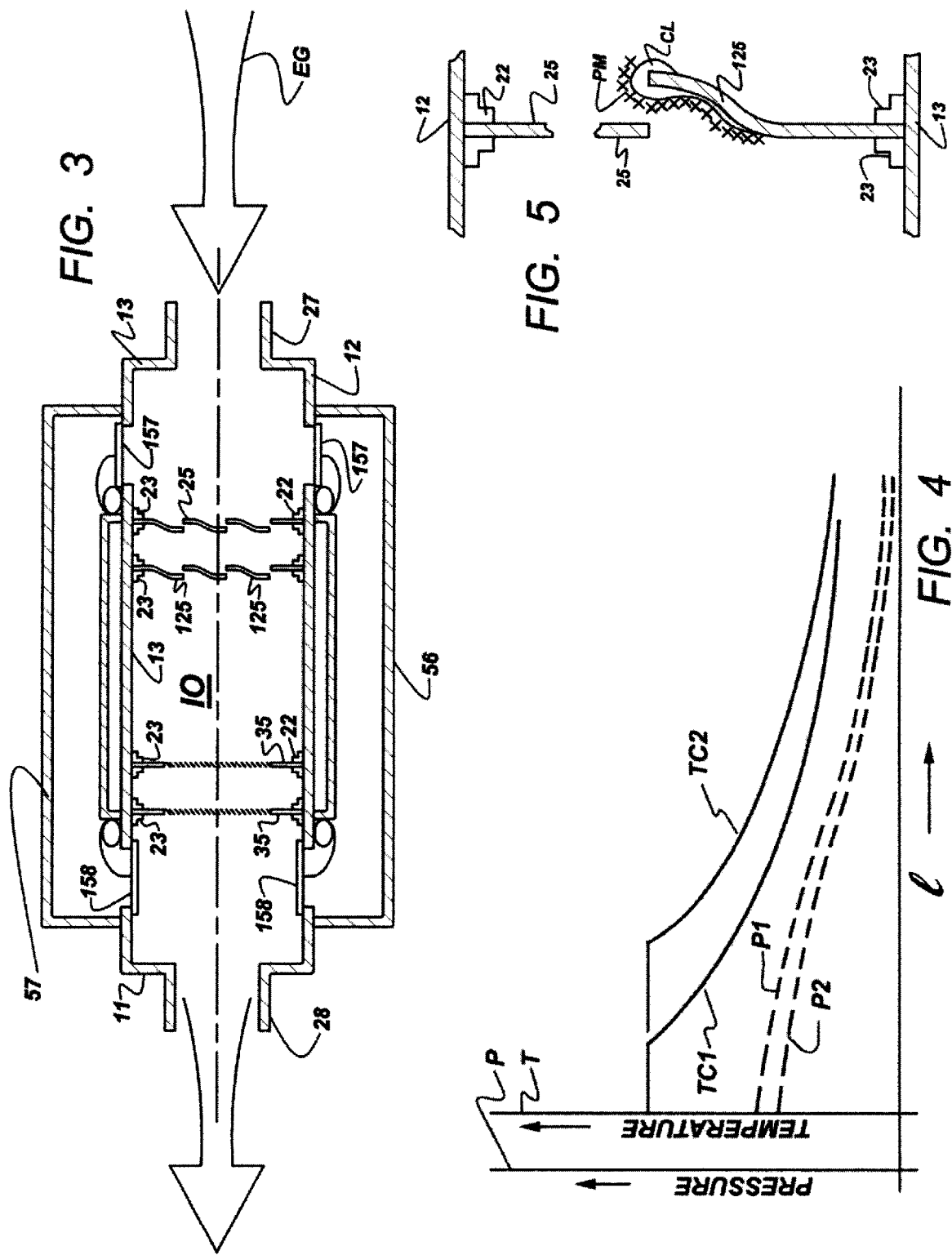

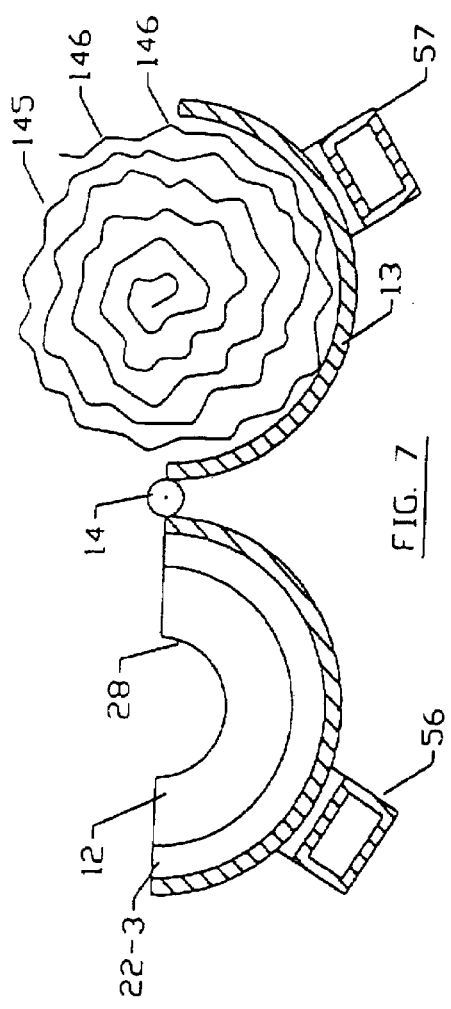
FIG. 7
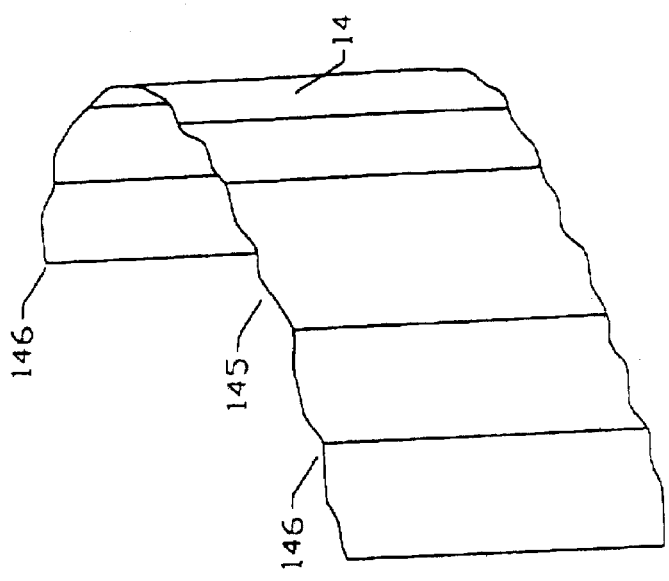
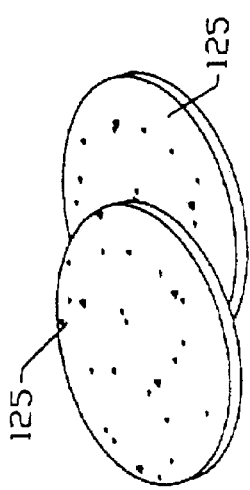
FIG. 8

EXHAUST FILTER AND CATALYST STRUCTURE

REFERENCE TO COPENDING APPLICATIONS

This application is a continuation-in-part of U.S. patent application Ser. No. 09/080,749, for DIESEL EXHAUST FILTER STRUCTURE, filed May 18, 1998, now abandoned.

BACKGROUND OF THE INVENTION

1. Field of the Invention

The present invention relates to exhaust gas filters, and more particularly to particulate matter collection and catalytic conversion structures useful in trapping the particulates and fumes of combustion emitted by a diesel power plant.

2. Description of the Prior Art

Diesel engines are characteristically very effective producers of power, primarily because of the high pressures and temperatures of combustion process thereof. While under ideal conditions the power efficiency of the diesel cycle is an attractive feature, in practice the process is infested with numerous faults. For example, once some wear has occurred and the ideal design conditions of combustion are no longer in place, the process becomes quite dirty with large by-products of incomplete combustion and particulates emitted. Those traveling the nation's highways will therefore be familiar with the dark exhaust plumes typically produced by a diesel powered truck. In fact it is the presence of these dark plumes that distinguishes the power plant.

In the recent past the foregoing pollution producing attributes of diesel power have had some attention in the rulemaking process of the US Environmenal Protection Agency [EPA] and heavy vehicles on our highways will therefore be regulated in their exhaust output by the year 2004. This regulatory impetus, along with the earlier concerns over the diesel exhaust, have focused public attention and techniques for trapping and collecting diesel exhaust products are now extensively sought. Exemplary teachings of such mechanisms can be found in U.S. Pat. Nos. 4,183,896 to Gordon; 3,946,748 to Frankfurt; and 4,852,349 to Abthoff et al. While suitable for the purposes intended each of the foregoing teachings either solves the pollution problem by mechanical traps or filters, or by chemical or catalytic processes. The synergistic benefits of a combination of both techniques have had little attention.

Catalytic processes typically rely on expensive material structures, such as platinum, and for that reason the catalyst is a significant cost component of any exhaust treating device. As a consequence techniques that either prolong the useful life of the catalyst, or allow for its convenient cleaning, are an economic necessity in any drive for cleaner exhaust. One factor inherent in the life of the catalyst is the accumulation of soot and condensate on the catalyst surfaces, a problem that is particularly exacerbated in a diesel process. Techniques that trap, reduce and allow for convenient cleaning of this accumulate are therefore desired and it is one such technique that is disclosed herein.

SUMMARY OF THE INVENTION

Accordingly, it is the general purpose and object of the present invention to provide an exhaust particulate accumulator conformed also to cool and condense vapors in the exhaust flow prior to exposure to a catalyst.

Other objects of the invention are to provide a reusable exhaust products collection canister that can be attached to a diesel exhaust.

Further objects of the invention are to provide an exhaust product collection canister which combines the condensation and kinematic processes for optimum reduction of combustion emissions, along with catalytic reactions.

Yet other and further objects of the invention are to provide an emission control device including a catalyst that may be conveniently refurbished by the manufacturer.

Briefly, these and other objects are accomplished within the present invention by providing a generally cylindrical, hollow casing cooled on the exterior by cooling fins and conformed for releasable attachment to the exhaust pipe of a diesel engine. In the first example the casing includes on its interior a series of transverse, perforated and louvered plates that act as kinematic traps and surfaces in the flow of particulate matter from the exhaust pipe. This kinematic exchange reduces the gas temperature of the exhaust flow, thereby promoting condensation of the exhaust vapors and their consequent collection in the form of condensate onto the same louvered plates. The collected condensate then acts as a glue or adhesive to trap additional particulate matter in the exhaust flow.

Accordingly, in the course of use particulate matter is accumulated on the first louvered plates, to form an insulative layer and thereby transfer the heat exchange and condensation functions to the next succeeding plate. Thus the utility period of this collection mechanism can be controlled by the number of plates in the sequence.

This first stage or group of coarse matter collection plates may then be followed by a finer perforation grouping, again in plural repetition, which may take the form as fine metal screening or even fiberglass matting. These fine disks then accumulate the lower temperature vapors and the finer particulate matter, in a manner similar to that earlier described.

A set of spring loaded by-pass vents may be provided to permit flow into exterior manifolds in the event that the collection plates are fully loaded in the course of use. At the same time, the canister may be split and hinged along its length to provide access to the collection plates for cleaning. A simple detergent cleaning process then transfers the collected condensate and particulate matter for proper disposal.

In the second example the benefits of the of the above described particulate filter structure may be used as a prefilter for a third stage including a catalyst, thus limiting the accumulation of debris thereon. The catalyst itself may take the form of a rolled up strip of corrugated metal on which a surface deposit of platinum group metals is accumulated. This tightly wound corrugated roll is then confined between further arcuate retainers along the flow through the housing, allowing for manual unwinding in the course of each cleaning sequence. As a consequence, the catalyst surfaces are protected by the filters, extending their life between cleanings.

While this example is useful with the filter structures described above, in those instances where the catalytic reaction increases the internal temperatures in the housing somewhat coarser filter grid may be used. Thus screen elements of expanded steel, or wire mesh, may provide the necessary collection elements in the exhaust flow, and at the same time are easily cleaned in a washing process. In this manner full reuse of the exhaust assembly is rendered both convenient and effective.

BRIEF DESCRIPTION OF THE DRAWINGS

FIG. 3 is a sectional side view of the inventive filtering structure taken alomg line 3—3 of FIG. 1;

FIG. 4 is a graphical illustration of the pressure and temperature, in increments of use of the inventive filtering structure;

FIG. 5 is a sectional side view of an inventive particulate accumulation disc useful with the present invention;

FIG. 7 is a sectional view taken along line 7—7 of FIG. 6; and

FIG. 8 is a perspective illustration separated by parts of the inventive pre-filtering structure and the catalyst surface deployed for cleaning.

DESCRIPTION OF THE PREFERRED EMBODIMENTS

Figure 1:
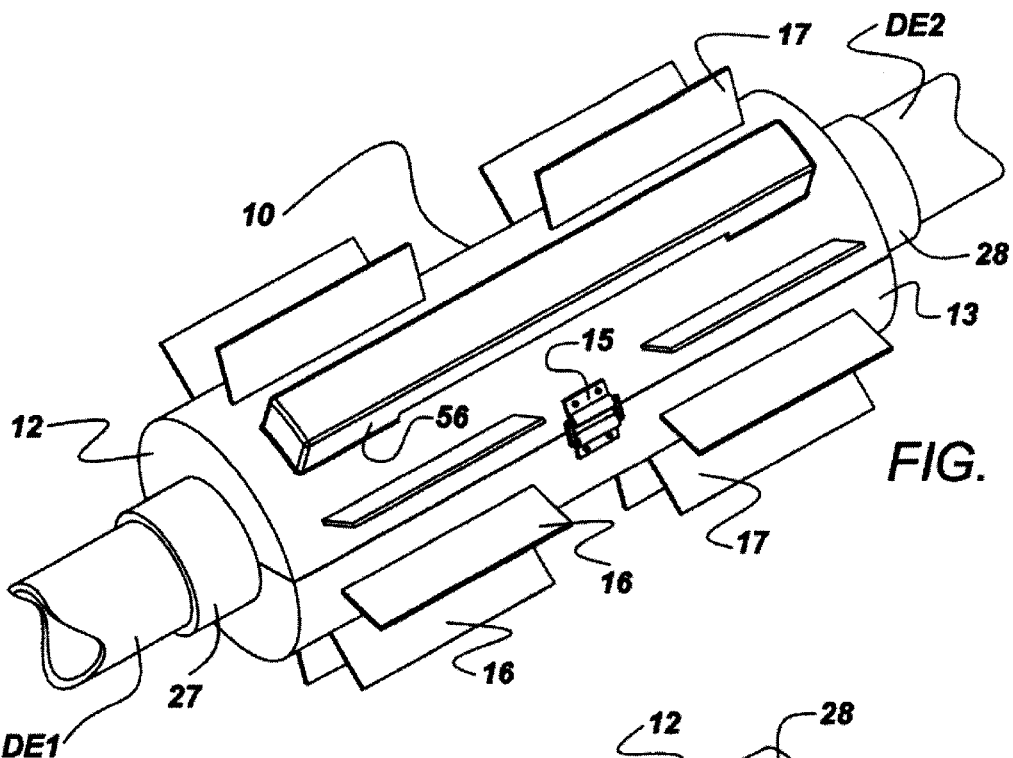
FIG. 1 is a perspective illustration, separated by parts, of the inventive exhaust filtering structure conformed for releasable engagement to a diesel engine.
Figure 2:
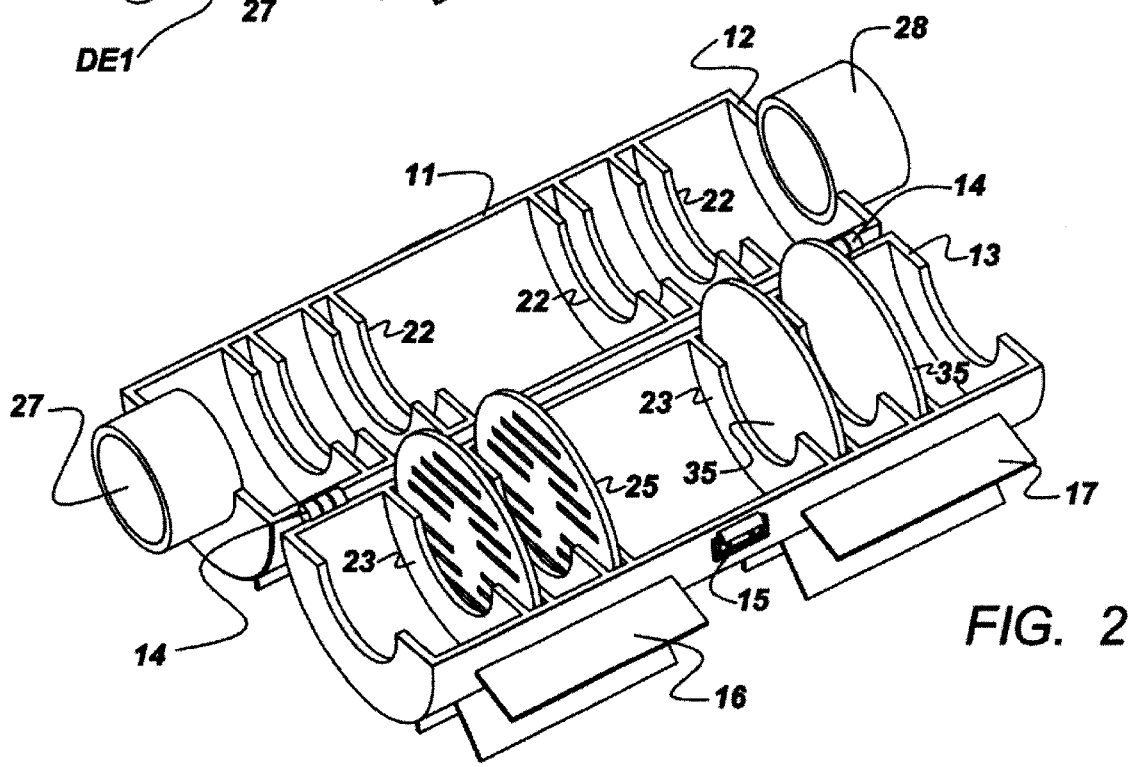
FIG. 2 is yet another perspective illustration of the inventive filtering structure shown in FIG. 1, illustrated in its open configuration.

As shown in FIGS. 1–5, the inventive exhaust filtering assembly, generally designated by the numeral 10, comprises a cylindrical canister 11 of a generally tubular construction and split longitudinally to form a first and second portion 12 and 13. Portions 12 and 13 may hinged to each other along one edge in a hinge 14 and may be clasped to each other in a clasp 15 on the other common edges. Portion 12, moreover, terminates in an intake collar 27 at one end and an outlet collar 28 at the other end for attachment to the parts DE1 and DE2 of a diesel engine exhaust system. Thus the canister 11, while still mounted in the exhaust circuit, may be selectively hinged open to expose the structure contained on the interior thereof.

The portions 12 and 13 are each provided with corresponding semicircular brackets 22 and 23 spaced in paired increments relative each other to capture therebetween corresponding first, circular kinematic discs 25 and second discs 35. Discs 25 may include a plurality of perforations 125 each shaped as a louvered perforation, and aligned to deflect the passage of the exhaust gas EG for kinematic impingement of any particulate matter carried in the exhaust stream.

On the exterior, both portions of canister 11 may be provided with radial cooling fins 16 and 17 by which the exhaust gas EG is cooled along its path through the canister. As result temperatures and pressures in the canister are reduced to the condensation temperatures, resulting in a condensate layer CL on the surface of louvers 125 onto which the successive particulate matter, shown as layer PM, is accumulated. Those skilled in the art will appreciate that the kinematic accumulation of particulate matter PM eventually effects an insulative result, with the resulting shift of temperature cooling down the canister, shown as temperature curves TC1 and TC2 in FIG. 4. Thus an axial repetition of plates or discs 25 will shift the temperature profile down stream, while still maintaining operative quality.

A second set of discs 35, of a much finer perforation geometry, are insertable down stream between the paired brackets 22 and 23, providing further filtering and condensation surfaces for condensates of even lower temperatures. In a manner similar to that described above, the finer apertures scour the finer particulate matter, to a level of cleanliness that may be specified by the various regulatory enactmants.

While the foregoing description illustrates only two levels of filtering apertures, such is for brevity only. Those in the art will appreciate that various filtering levels may be installed by simple expedient of insertion between the paired brackets 22 and 23 of discs of various structural fineness. Thus fiberglass discs or discs made of steel wool may be inserted in place of discs 35 without departing from the intended objective. Such replacements may be effected by trial and error, as by-pass conduits are provided between fins 16 and 17, shown as by-pass manifolds 56 and 57 each including a spring loaded relief opening 157 proximate collar 27 and a spring loaded return opening 158 proximate collar 28. Thus premature overloading of the discs will result in the exhaust release through the by-pass circuit, permitting continued operation.

On the occassions of saturated build-up of combustion debris on the several discs 25 and 35, the assembly may be opened and then cleaned by ordinary detergent processes. Thus the assembly is conveniently renewable by ordinary maintenance expedients.

Figure 6:
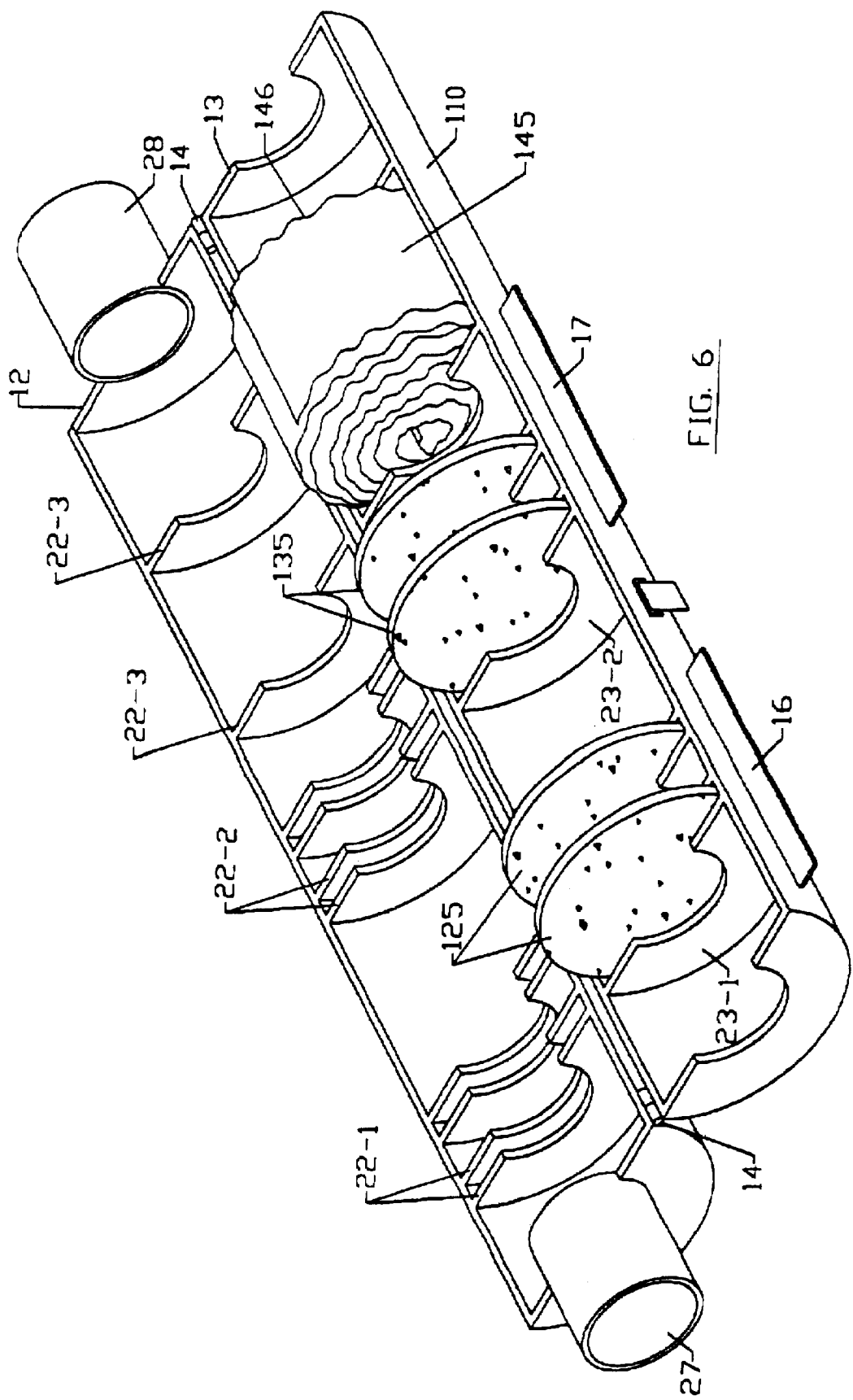
FIG. 6 is yet another perspective illustration of a second embodiment of the present invention, including a catalytic segment therein.

By reference to FIGS. 6 through 8, inclusive, a second embodiment of the inventive exhaust assembly, generally designated by the numeral 110, is again enclosed in a hinged housing. Like numbered parts functioning in like manner to that previously described, housing 11 is again formed of hinged housing halves 12 and 13. Within the interior of each housing half paired arcuate retainers 22-1, 23-1, 22-2, 23-2 and 22-3 and 23-3 cooperatively form paired restraints between which a first, coarse, set of filter mesh discs 125, a finer mesh set of filter discs 135 and a tightly wound corrugated strip of catalytic material in the form of a roll 145 are retained.

Coil 145 is formed of a known material structure used in stationary catalytic cleaners sold under the mark or designation Camet Catalyst System by the Engelhart Corporation, 2205 Chequers Court, Bel Air, Mo. 21015. This catalytic material is characterized by a stainless steel, corrugated substrate onto which platinum group metals suspended in a wash coating are deposited. Since the corrugations 146 align along the axis of the housing 11. Thus a set of longitudinal passages is defined by the tightly wound and overlapping corrugations through which the exhaust gas, first filtered by discs 125 and 135, in sequence, is passed.

While discs 125 and 135 may be implemented in the manner of discs 25 and 35, the heat added by the catalytic process may require more numerous sharp edges for vapor condensation and the discs 125 and 135, therefore, may be formed of expanded metal or wire mesh. In this form the discs are each easily soaked and thereafter washed of all the debris. Similarly the coiled up roll 145 may be released for expansion in the soaking medium, and again thereafter washed off. In this manner the whole of the interior filtering and cleaning structure may be periodically renewed by techniques available to everyone.

Obviously, many modifications and variations can be accomplished without departing from the spirit of the present invention. It is therefore intended that the scope of the instant invention be determined solely by the claims appended hereto.

We claim:

1. A filter assembly conformed for attachment to the exhaust pipe of a diesel powerplant, comprising:

a housing defined by a first and second shell hinged to each other along a respective edge to cooperatively form a generally cylindrical cavity;

a plurality of first arcuate retainer brackets formed in the interior of said first housing shell;

a plurality of second arcuate retainer brackets formed in the interior of said second housing shell, each in an opposed axial spacing relative a corresponding one of said first arcuate retainer;

a first set of kinematic filter plates received in the common interior of said first and second shells in retained engagement between corresponding ones of said first and second arcuate brackets;

a second set of kinematic filter plates received in the common interior of said first and second shells in retained engagement between corresponding others of said first and second arcuate brackets, said second filter plates including perforations smaller than said first filter plates;

a strip of corrugated material coated on the exterior with a catalyst bearing coating wound into a coil with the corrugations overlying each other to form passages therebetween, received between further ones of said first and second retainer brackets to align said passages generally along the longitudinal axis of said housing; and attachment means for releasably securing said first and second shells to each other.

2. Apparatus according to claim 1, wherein:

said first kinematic filter plates include expanded metal material structure arranged in overlapping sheets for producing exhaust flow discontinuities at the perforations thereof thereby reducing the exhaust flow energy through said assembly.

3. Apparatus according to claim 1, further comprising:

a bypass conduit formed in said first shell for selectively passing said exhaust flow around said first and second filter plates and said wound strip of corrugated material.

4. Apparatus according to claim 3, wherein:

said bypass conduit includes spring loaded opening means conformed to open said conduit upon a preselected pressure differential across said first and second filter plates and said wound strip of corrugated material.

5. A filter assembly conformed for attachment to the exhaust pipe of a diesel powerplant, comprising:

a housing defined by a first and second shell hinged to each other along a respective edge to cooperatively form a generally cylindrical cavity;

a plurality of first arcuate retainer brackets formed in the interior of said first housing shell;

a plurality of second arcuate retainer brackets formed in the interior of said second housing shell, each in an opposed axial spacing relative a corresponding one of said first arcuate retainer;

a first set of kinematic filter plates received in the common interior of said first and second shells in retained engagement between corresponding ones of said first and second arcuate brackets;

a second set of kinematic filter plates received in the common interior of said first and second shells in retained engagement between corresponding others of said first and second arcuate brackets, said second filter plates including perforations smaller than said first filter plates;

a strip of corrugated material coated on the exterior with a catalyst bearing coating wound into a coil with the corrugations overlying each other to form passages therebetween, received between further ones of said first and second retainer brackets to align said passages generally along the longitudinal axis of said housing;

attachment means for releasably securing said first and second shells to each other; and a bypass conduit formed in said first shell for selectively passing said exhaust flow around said first and second filter plates and said wound strip of corrugated material.

6. Apparatus according to claim 5, wherein:

said first kinematic filter plates include expanded metal material structure arranged in overlapping sheets for producing exhaust flow discontinuities at the perforations thereof thereby reducing the exhaust flow energy through said assembly.

7. Apparatus according to claim 6, wherein:

said bypass conduit includes spring loaded opening means conformed to open said conduit upon a preselected pressure differential across said first and second filter plates and said wound strip of corrugated material.

8. Apparatus according to claim 5, wherein:

said first kinematic filter plates include louvered perforations conformed to effect a reduction in energy in the exhaust flow through said assembly.

9. Apparatus according to claim 8, wherein:

said bypass conduit includes spring loaded opening means conformed to open said conduit upon a preselected pressure differential across said first and second filter plates.

* * * * *